(12) United States Patent
Ryan

(10) Patent No.: US 6,560,669 B1
(45) Date of Patent: May 6, 2003

(54) DOUBLE DATA RATE SYNCHRONOUS MEMORY WITH BLOCK-WRITE

(75) Inventor: Kevin J. Ryan, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/314,056

(22) Filed: May 18, 1999

Related U.S. Application Data

(60) Provisional application No. 60/085,947, filed on May 19, 1998.

(51) Int. Cl.[7] .......................... G06F 12/00; G06F 13/00
(52) U.S. Cl. .................. 711/105; 711/167; 365/230.03; 365/230.04; 365/230.08
(58) Field of Search ............................ 711/105, 167; 365/230.01, 230.05, 230.08; 345/538, 534

(56) References Cited

U.S. PATENT DOCUMENTS

| | | | | |
|---|---|---|---|---|
| 4,816,815 A | * | 3/1989 | Yoshiba .................. 345/538 |
| 5,612,922 A | * | 3/1997 | McLaury ............... 365/230.05 |
| 5,659,518 A | * | 8/1997 | McLaury ............... 365/230.05 |
| 5,717,904 A | * | 2/1998 | Ehlers et al. ............... 345/511 |
| 5,740,179 A | * | 4/1998 | Dorney et al. .............. 714/719 |
| 5,781,496 A | * | 7/1998 | Pinkham et al. ....... 365/230.03 |
| 5,787,046 A | * | 7/1998 | Furuyama et al. ..... 365/230.03 |
| 5,956,744 A | * | 9/1999 | Robertson et al. .......... 711/122 |
| 5,991,232 A | * | 11/1999 | Matsumura et al. ........ 365/233 |
| 6,016,270 A | * | 1/2000 | Thummalapally et al. ....... 365/185.11 |
| 6,094,396 A | * | 7/2000 | Zheng ................... 365/230.03 |
| 6,154,418 A | * | 11/2000 | Li .............................. 365/233 |
| 6,157,560 A | * | 12/2000 | Zheng .......................... 365/63 |
| 6,259,647 B1 | * | 7/2001 | Ooishi .................. 365/230.01 |
| 6,337,832 B1 | * | 1/2002 | Ooishi et al. ................ 365/233 |
| 6,339,552 B1 | * | 1/2002 | Taruishi et al. ......... 365/189.05 |
| 6,457,094 B2 | * | 9/2002 | Zheng ......................... 711/105 |

* cited by examiner

Primary Examiner—Reginald G. Bragdon
Assistant Examiner—Pierre M. Vital
(74) Attorney, Agent, or Firm—Hugh R. Kress; Winstead, Sechrest & Minick, P.C.

(57) ABSTRACT

A method and apparatus for performing a block-write to a memory device comprising at least one register, a data input port, at least one memory bank, and a hardware device to block-write data from the register to the memory device, including receiving a first portion of block-write data from a data bus during a first half of a clock cycle; then, producing a second portion of the block-write data, and block-writing the first and second portions of the block-write data from a write logic unit to the memory bank at a double data rate as determined by the clock cycle.

28 Claims, 14 Drawing Sheets

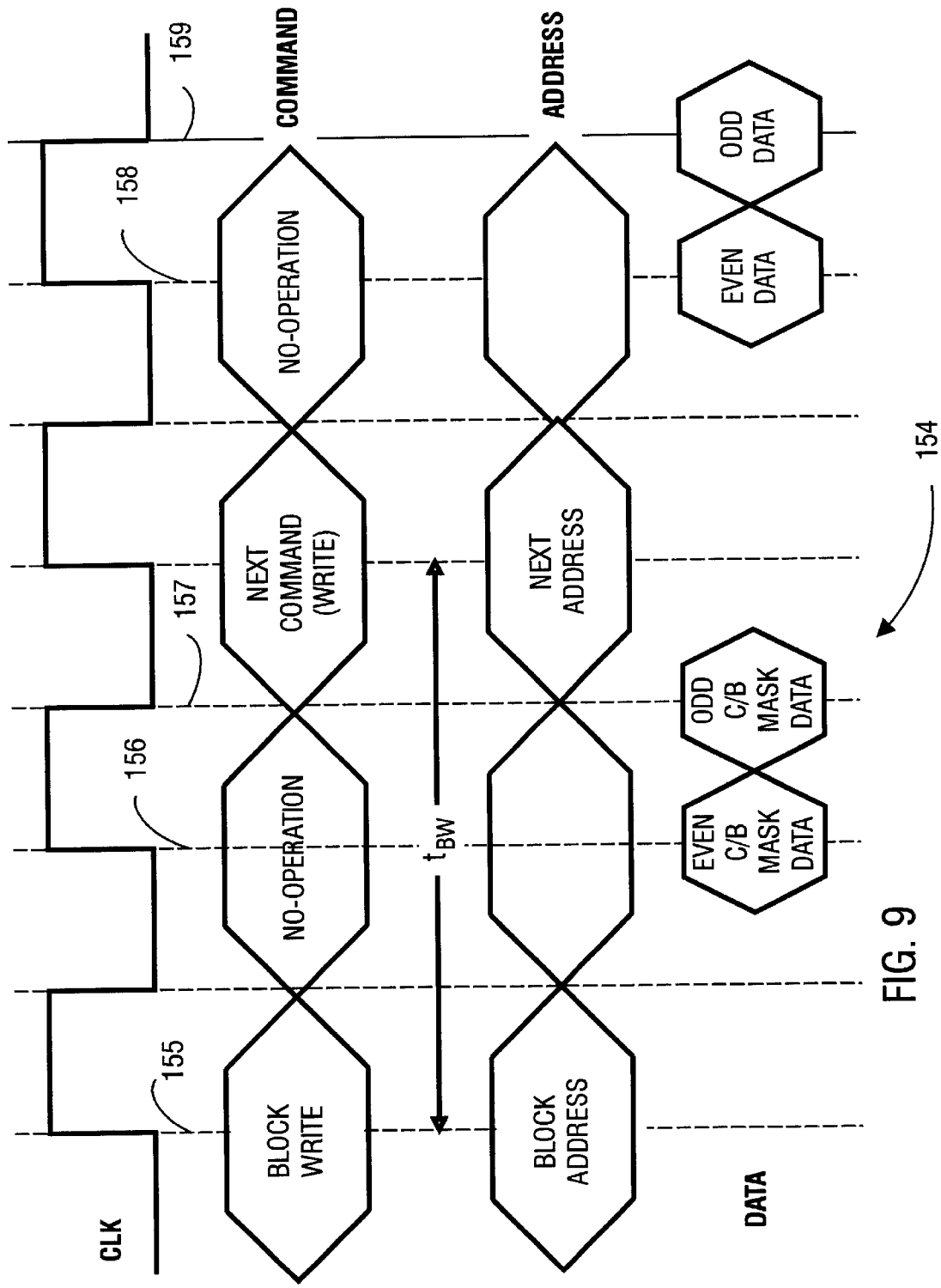

DOUBLE DATA RATE SYNCHRONOUS MEMORY WITH BLOCK-WRITE

This application claims the benefit of U.S. Provisional Application No. 60/085,947, filed May 19, 1998.

BACKGROUND OF THE INVENTION

1. Field of the Invention

This invention was made in attempting to solve specific problems in connection with computer memory devices. The problem being addressed by the inventor was that of improving the access and processing speed of memory devices using double data rate block-writes.

2. Description of the Related Art

To construct a video display of colored pixels, a computer creates a block of video data through a large number of memory writes. Since memory accesses are slower than many internal processor operations, creating the data blocks used in video applications entails substantial computer time. One direction for improving video applications involves decreasing the time needed to create blocks of video data in a memory.

FIG. 1. shows a timing diagram 10 for input signals in one type of prior art memory device (not shown). A clock signal 12 synchronizes memory accesses associated with command 14; address 16, e.g., column, row and bank address; and data signals 18. The memory device latches the command, address and data signals 14, 16, 18 on rising edges 20, 22, 24, 26 of the clock signal 12. The illustrated memory device latches the command, address, and data signals 28, 30, 32 on the same rising edge 20, but other memory devices may have a latency period between the latching of the command/address signals and the data signal (not shown).

Referring still to FIG. 1, the memory device can latch one data signal, e.g., DATA m, DATA m+1, DATA m+2, DATA m+3, on the rising edge 20, 22, 24, 26 of each of four clock cycles. Since the memory devices latches one packet of write data during each CLK signal, the memory illustrated by the timing diagram 10 is referred to as a memory device operating at a single data rate. During latency periods in which the memory device is executing a command, external signals for no new operation (NO-OP) may be received.

Some prior art memory devices can also perform block-writes. A block-write stores the same data to a block of memory locations, e.g., a number of adjacent column addresses, through a single write command. The use of block-writes can increase the effective speed of a memory device, which performs many write operations with the same data. Video applications frequently write the same data, e.g., a pixel color, to a large block of memory locations, i.e., to record the individual color pixels of an image. Block-writes can speed up video applications.

FIG. 2 shows a timing diagram 50 for external signals to a memory device (not shown) performing a block-write. The memory device latches a block-write command 52, a block address 54, and mask data 56 on a rising edge 58 of the clock signal 12. The actual block-write occurs during a time period $t_{BW}$ subsequent to latching the block-write command 52. The illustrated memory device can perform a block-write every two clock cycles, i.e., another block-write command can be latched $t_{BW}$ after latching the present block-write command.

The advantages of block-writes can be understood by comparing the ordinary write of FIG. 1 to the block-write of FIG. 2. If the block-write of FIG. 2 stores data to 8 adjacent column addresses, the block-write writes an average of up to 4 memory locations per clock cycle, i.e., if subsequent block-writes are $t_{BW}$ apart. The ordinary write of FIG. 1 writes up to one memory location per clock cycle, i.e., if subsequent writes are spaced by the time to complete a write burst. Thus, the 8-column block-write of FIG. 2 has an effective write speed of up to 4 times the write speed of the ordinary write of FIG. 1. Increasing the number of columns written through block-writes effectively increases the write speed of a memory.

A block-write writes to blocks of memory locations having a fixed size, e.g., a fixed number of adjacent column addresses. Employing mask data in conjunction with a block-write introduces flexibility into the size of the blocks written. The mask data disables a subset of the fixed number of memory locations of the block so that the block-write does not store new data to the disabled subset. For example, a 8-column block-write performed with an 8 binary-digit mask (00111101) would write data to columns 3, 4, 5, 6, and 8 of a chosen block of adjacent memory locations. Thus, the use of mask data enables the performance of selective block-writes.

The mask data may also be employed to disable selected bits or bytes within each memory location. The ratio of the size of the block written to the number of mask data bits determines the selectivity of a block-write. For example, a mask of 32 bits enables selectivity at the 1 byte level for an 8-column block-write to memory locations of 4 byte size. Masks provide a write selectivity determined by the size of the mask.

Since video applications often store each pixel of an image in a separate byte of memory, memory allocated for a video image may have different data stored in adjacent bytes. A masked block-write can store a video image to memory if the mask enables writing different data in adjacent bytes of memory, i.e., selectivity at the one byte-level. For a 16-column block-write to 4-byte memory locations be used in video applications, 64 bits have to be provided with each block-write command.

Memory devices having 32 bit wide data packets, could ordinarily provide 32 bits of mask data per clock cycle—an insufficient mask for the above-described video application. The usefulness of block-write in video memory devices would be increased if the size of the block could be increased without sacrificing selectivity.

The additional cost and complexity of implementing block-writes, as compared to other alternatives, may not be justified for the above-described effective speeds of 8-column block-writes. Nevertheless, the write speeds obtainable through the other alternatives substantially limit the speeds of video applications. Thus, further improvements to block-writes may enable faster video applications.

The present invention is directed to overcoming, or at least reducing the effects of, one or more of the problems set forth above.

SUMMARY OF THE INVENTION

A method and apparatus are provided to perform block-writes to a memory device. In a first aspect of the invention, the memory device includes a register adapted to store data for a block-write, a data input port to send data to the register, at least one memory bank, and a hardware device to block-write data from the register to the memory device. The data input port is incapable of receiving as many bits of data in parallel as the register sends to the memory bank during a block-write.

In a second aspect of the invention, the method for performing a block-write to a memory bank includes receiving a first portion of block-write data from a data bus during a first half of a clock cycle; then, producing a second portion of the block-write data, and block-writing the first and second portions of the block-write data from the write logic unit to the memory bank at a double data rate. The clock cycle determines the data rate.

In a third aspect of the invention, a second memory device is provided including an input port capable of receiving mask data, and the memory device is adapted to perform a block-write with the mask data at a double data rate. In a fourth aspect of the invention, a second method to perform block-writes to a memory device is provided. The second method performs masked block-writes. The second method also includes writing mask data to a memory device at a double data rate and performing the masked block-writes using the mask data.

BRIEF DESCRIPTION OF THE DRAWINGS

Other aspects and advantages of the invention will become apparent upon reading the following detailed description and upon reference to the drawings, in which:

FIG. 9 is a timing diagram for the external clock, command, address and data/mask signals to the memory devices of FIGS. 10 and 11 as operated in accordance with the invention;

DETAILED DESCRIPTION OF SPECIFIC EMBODIMENTS

Specific embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The drawings illustrate of method and apparatus for performing masked block-writes. Henceforth, a "block-write" shall be a write to a block of memory locations of fixed size in response to a single address command or during a single write cycle. A separate write cycle may be defined, for example, by each external write command. The various embodiments perform block-writes to a plurality of adjacent column addresses, but the invention is not limited to this geometry. Henceforth, a "masked block-write" shall be a block-write, which employs a mask to limit the block-write to a chosen subset of the locations within the block. In both masked and normal block-writes, the same data is written to each write-enabled location of the chosen block of memory.

Figure 1:
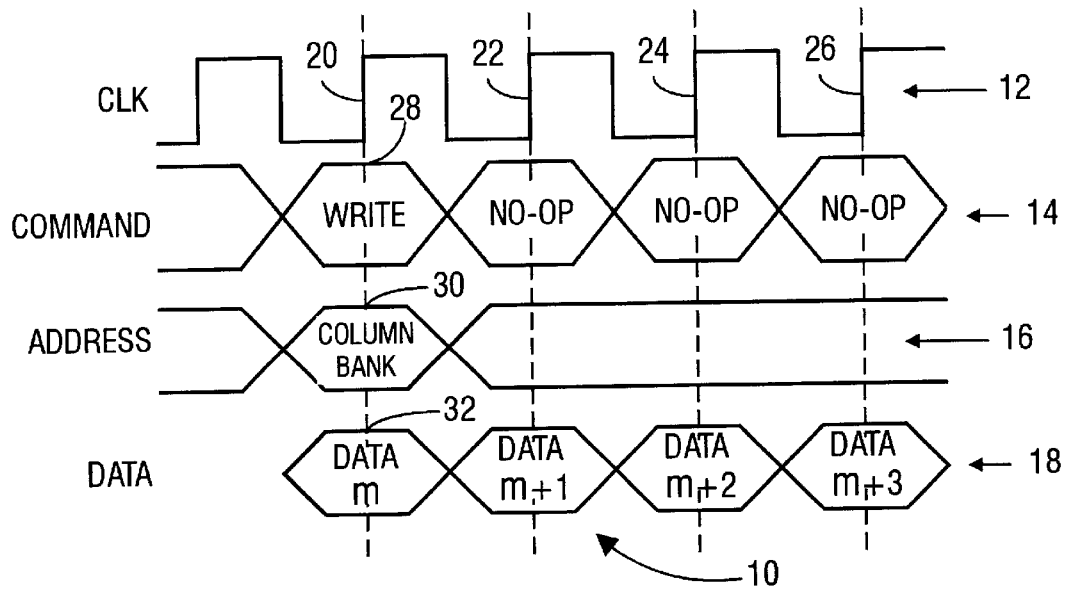
FIG. 1 is a timing diagram for a prior art method of writing data at a single data rate.
Figure 2:
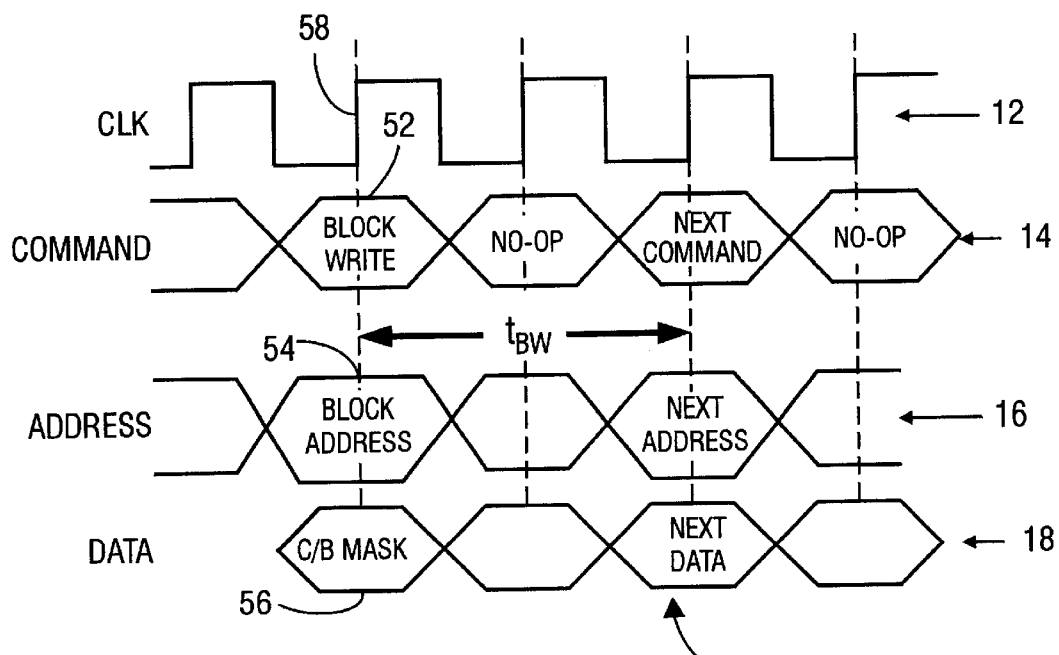
FIG. 2 is a timing diagram for a prior art method of block-writing data.
Figure 3:
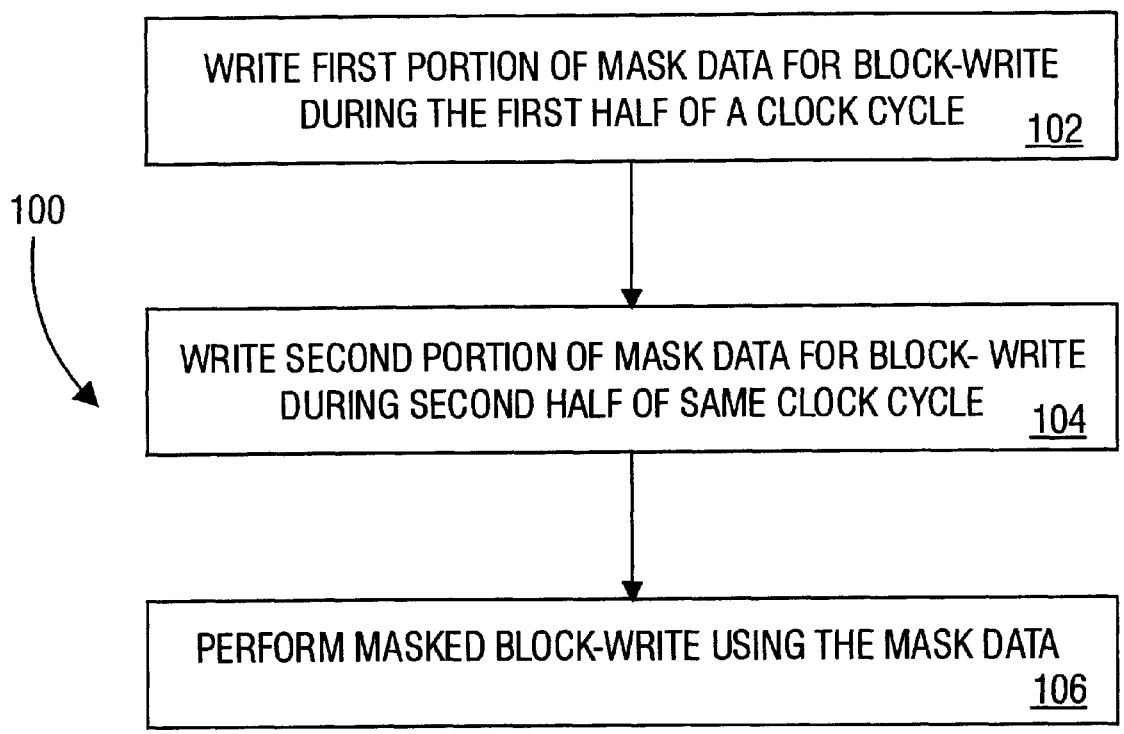
FIG. 3 is a flow chart illustrating a method of performing block-writes at a double data rate in accordance with the invention.

FIG. 3 illustrates a method 100 for performing masked block-writes at a double data rate. At block 102, a first portion of the mask data is written to the memory device, e.g., the memory devices 110, 140 of FIGS. 4 and 5 discussed more fully below, during the first half of a clock cycle. At block 104, a second portion of the mask data is written to the memory device during the second half of the same clock cycle. At block 106, the memory device performs a block-write using the mask data received in the clock cycle. Since mask data is written twice in a clock cycle, i.e., at a double data rate, the number of binary digits of the mask data received may exceed the number of available data input ports (not shown) for the memory device.

Still referring to FIG. 3, some embodiments write the first and second portions of the mask data to the memory device on respective rising and falling edges of the clock cycle. Other embodiments write the first and second portions of the mask data at positive and negative crossing points of two out-of-phase timing signals. The exact triggering points on the clock signals are not material to the practice of the present invention if two separate portions of mask data are written to the memory device during each block-write cycle.

Figure 4:
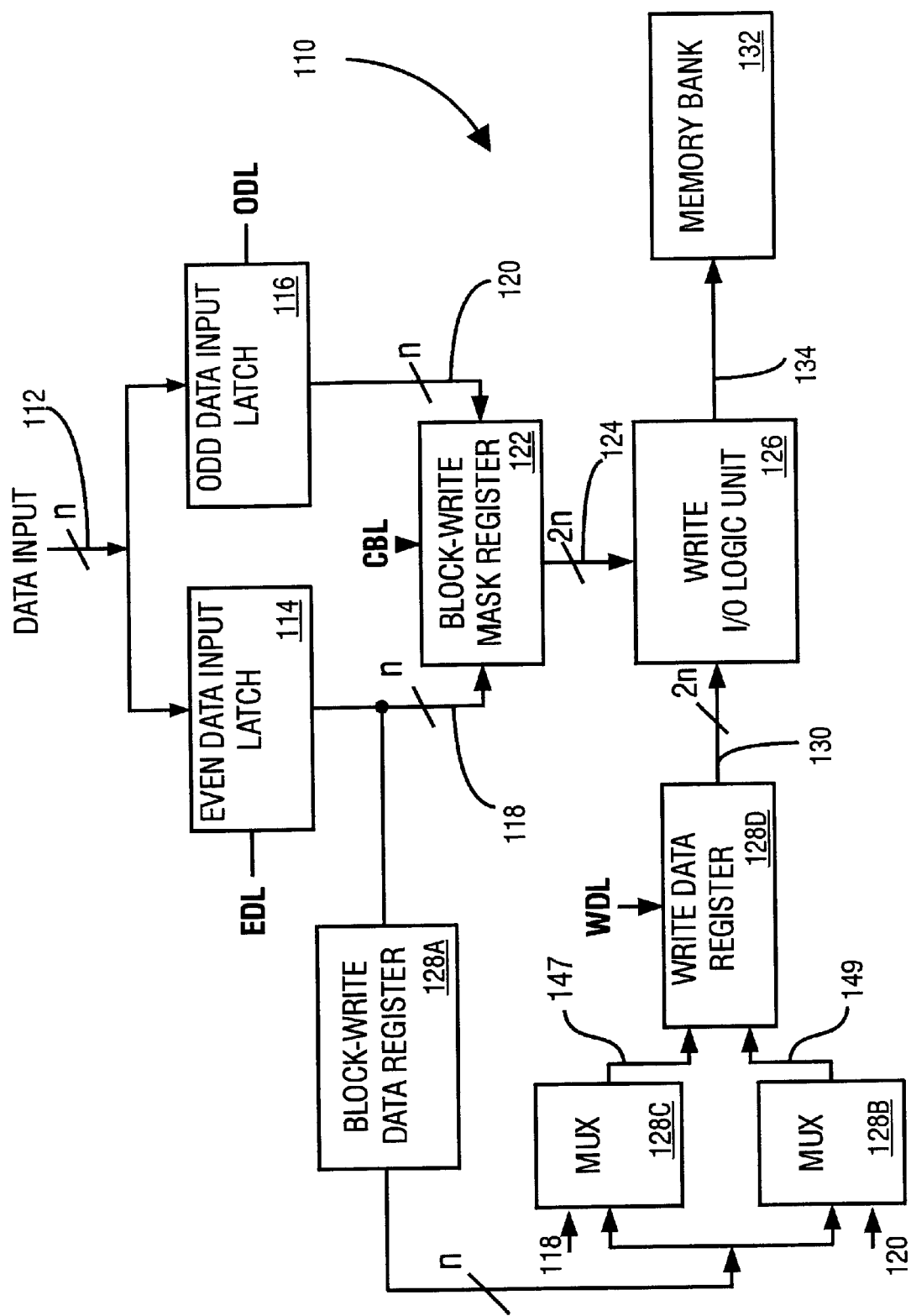
FIG. 4 is a block diagram of a memory device constructed and operated in accordance with the method of FIG. 3.

FIG. 4 illustrates a first embodiment of a memory device 110, which performs block-writes at a double data rate in a manner such as the method 100 of FIG. 3. A data input port 112 receives input data signals having n binary digits from an external bus line carrying n bit data signals (not shown). The data input port 112 connects to even and odd data input latches 114, 116. The even and odd data input latches 114, 116 receive mask data for block-writes. In some embodiments, the data input latches receive both mask data for block-writes and data for ordinary writes to the memory device 110. In some embodiments separate data input latches or registers (not shown) receive the mask data. Then, the number n, equal to the number of input lines and to the number of external bus lines (both not shown) for mask data, is still smaller than the number, 2n, of binary digits of mask data per block-write. The n output lines 118, 120 from each data input latch 114, 116 connect to a block-write mask register 122. The block-write mask register 122 has 2n output lines 124 that connect to a write input/output (I/O) logic unit 126. A block-write data register 128A stores the data written in block-writes. Multiplexers 128B, 128C direct either normal write data or block-write data to the write data register 128D, depending on the type of write cycle. For a block-write cycle, block-write data is directed to the write data register 128D, thereby forming a 2n-bit data word from the n-bit block write data register 128A. The write data register 128D has 2n output lines 130 connecting to the write I/O logic unit 126. The write I/O logic unit 126 has output lines 134 connecting to a memory bank 132. Though the data input port 112 has only n data input lines for receiving n binary digits of data, the block-write mask register 122 has 2n lines 124 for transmitting 2n binary digits of block-write mask data to the write I/O logic unit 126 to control the selectivity of block-writes, and the write data register 128D has 2n bits of block-write data to be written to the memory bank 132.

Figure 6:
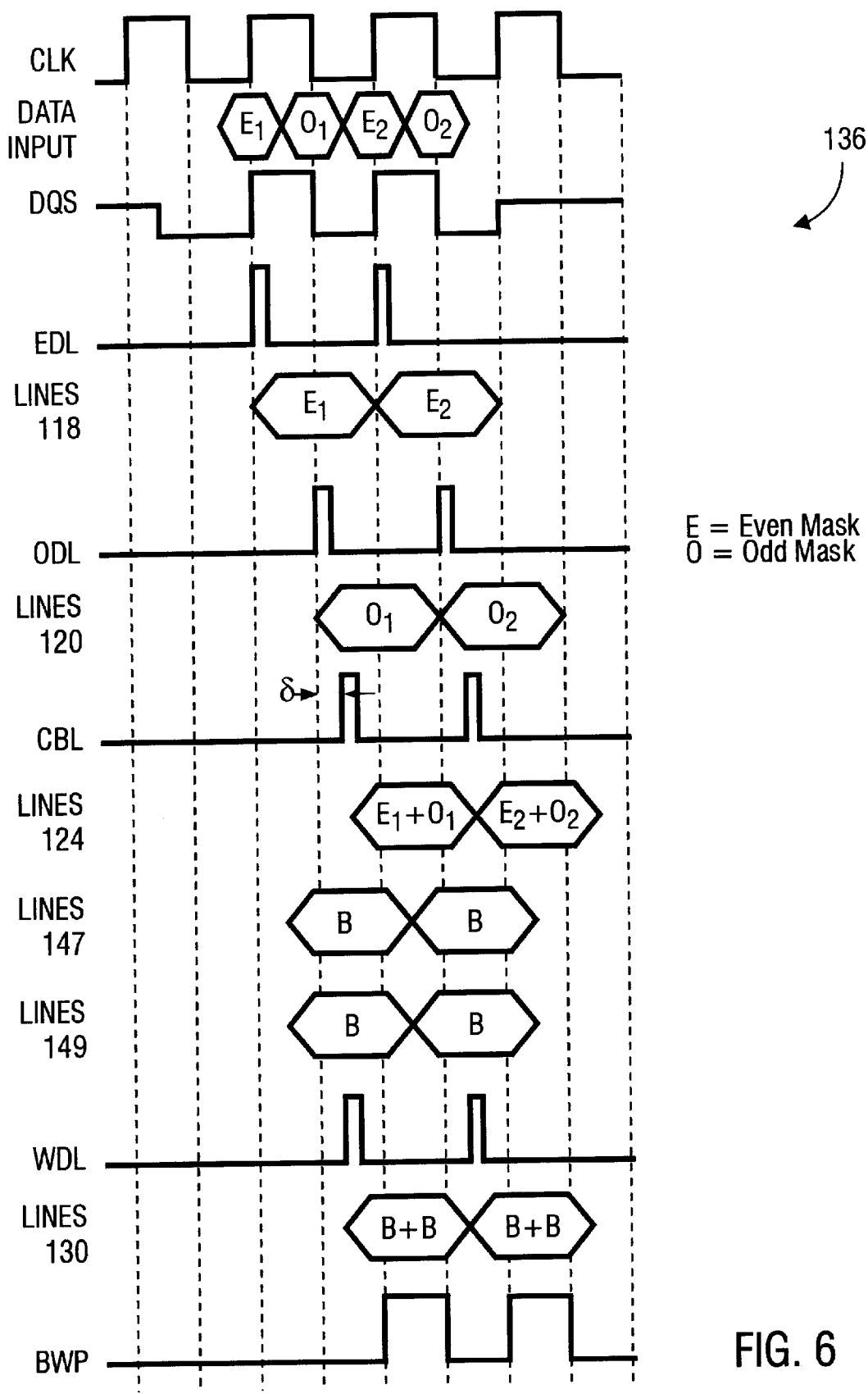
FIG. 6 is a timing diagram for the memory device of FIG. 4 as operated in accordance with the invention.

FIG. 6 is a timing diagram 136 illustrating the operation of the memory device 110 of FIG. 4, for two successive block write cycles, with each block write cycle equal to one cycle of the master clock signal (CLK). A DQ Strobe (DQS) signal, nominally aligned with CLK, synchronizes the internal timing of mask and data transfers during a block-write in the memory device 110 of FIG. 4. In the illustrated embodiment, all data transfers occur on rising edges of the appropriate timing signals. In other embodiments, data transfers may occur at other triggering points of the appropriate internal timing signals.

Referring still to FIGS. 4 and 6, the even and odd data input latches 114, 116 transfer even and odd mask data from the data input port 112 to the respective output lines 118, 120 in response to an even data input latch (EDL) signal and an odd data latch signal (ODL), respectively. The EDL signal is derived from the rising edges of the DQS signal, i.e., the even portion of the mask-data is latched on the rising edges. Similarly, the ODL signal is derived from the falling edges of the DQS signal, i.e., the odd portion of the mask-data is latched on the falling edges. In the embodiments, the even and odd portions of binary digital signals include half of the binary data digits of the relevant signals. The column-byte mask load (CBL) signal enables the block-write mask register 122 to transfer the entire mask-data, i.e., both even and odd portions, from the n output lines 118, 120 to the 2n output lines 124. The voltage of the CBL signal may rise, a short time δ, after both the even and odd data input latches 114, 116 have latched the even and odd mask data to allow for the propagation delay of the odd input latch 116.

A write data latch (WDL) signal enables the write data register 128D to transmit the entire block-write data word (a 2n-bit word B+B, where B is the n-bit word previously stored in register 128D) to the write I/O logic unit 126 with timing similar to the transmission of the entire mask-data from the block-write mask register 122. A block-write pulse (BWP) signal, internal to the write I/O logic unit 126, controls the transfer of block-write data from the write data register 128D to the memory bank 132, subject to the block-write mask data signals 124. Twice as many bits of mask data and twice as many bits of block-write data, are transmitted to the write I/O logic unit 126 as are received in one packet at the data input port 112, i.e., double "mask" data rate operation, and double data rate operation.

Still referring to FIG. 4, the rising edge of the WDL signal of some embodiments may precede/follow the rising edge of the CBL signal so that the block-write data arrives at the write I/O Logic unit 126 before/after the block-write mask data. If the WDL signal precedes the CBL signal, the CBL signal acts to enable memory locations of the memory bank 132. Data is not stored to the memory bank 132 before the arrival of the block-write mask data.

Figure 5:
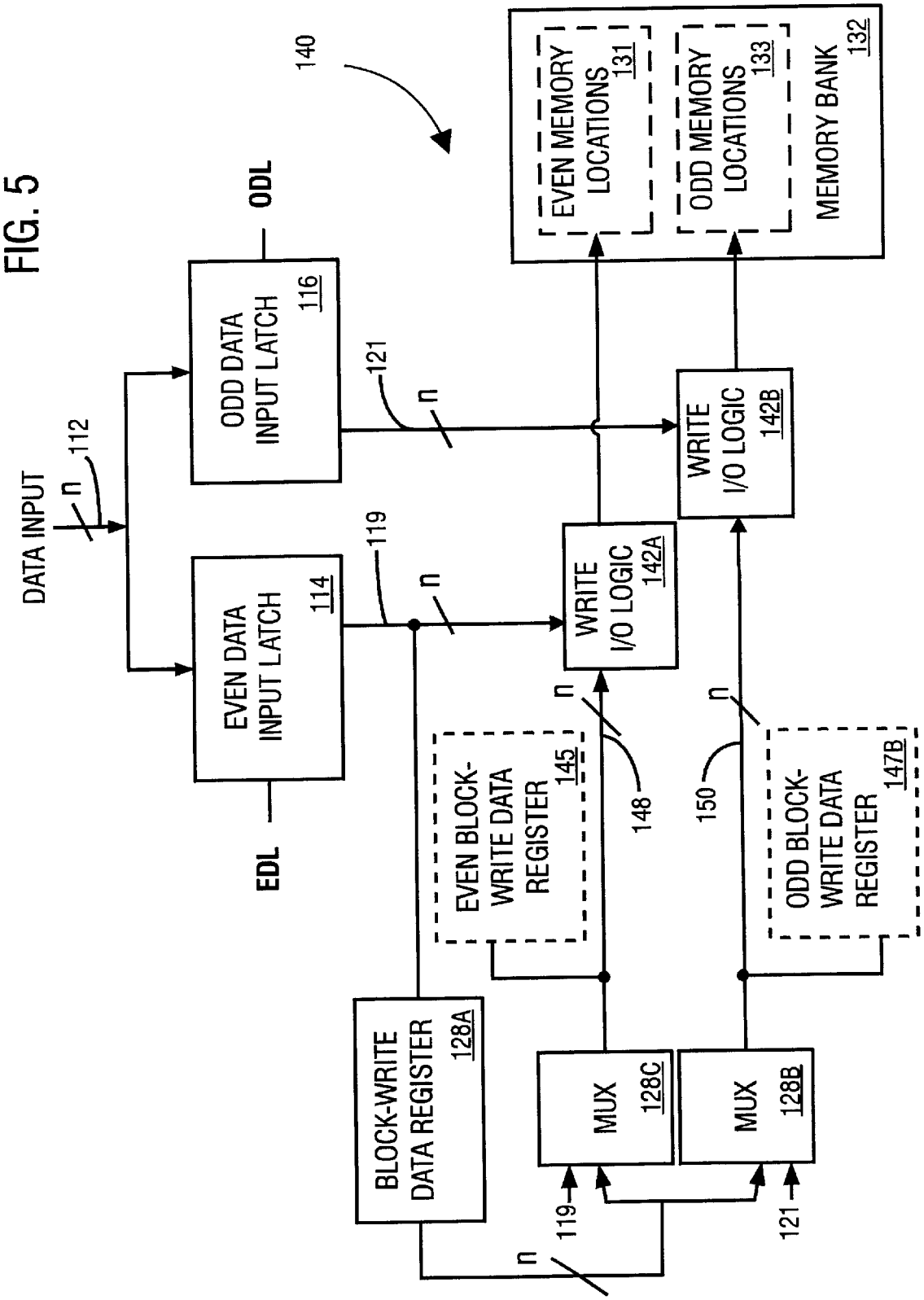
FIG. 5 is a block diagram of a memory device constructed and operated in accordance with the method of FIG. 3.

FIG. 5 illustrates a second embodiment for a memory device 140, which performs block-writes at a double data rate. The data input port 112 couples to even and odd data input latches 114, 116. The even and odd data input latches 114, 116 receive and transmit even and odd portions of the mask data for block writes and even and odd data for normal writes. Output lines 119, 121 individually connect outputs of the even and odd data latches 114, 116 to a write I/O logic unit 142. The memory device 140 includes a block-write data register 128A and multiplexers 128B, 128C, similar to the embodiment of FIG. 4, or alternatively, even and odd block-write data registers 145, 147B, which couple to the write I/O logic unit 142A and 142B by individual output lines 148, 150. The write I/O logic units 142A and 142B transmit the even and odd block-write data to separate even and odd memory locations 131, 133 of the memory bank 132. In the memory device 140, the internal lines 119, 121, for block-write mask data, and the internal lines 148, 150, for block-write data carry binary signals with the same number of digits as the number n of lines leaving the data input port 112.

Figure 7:
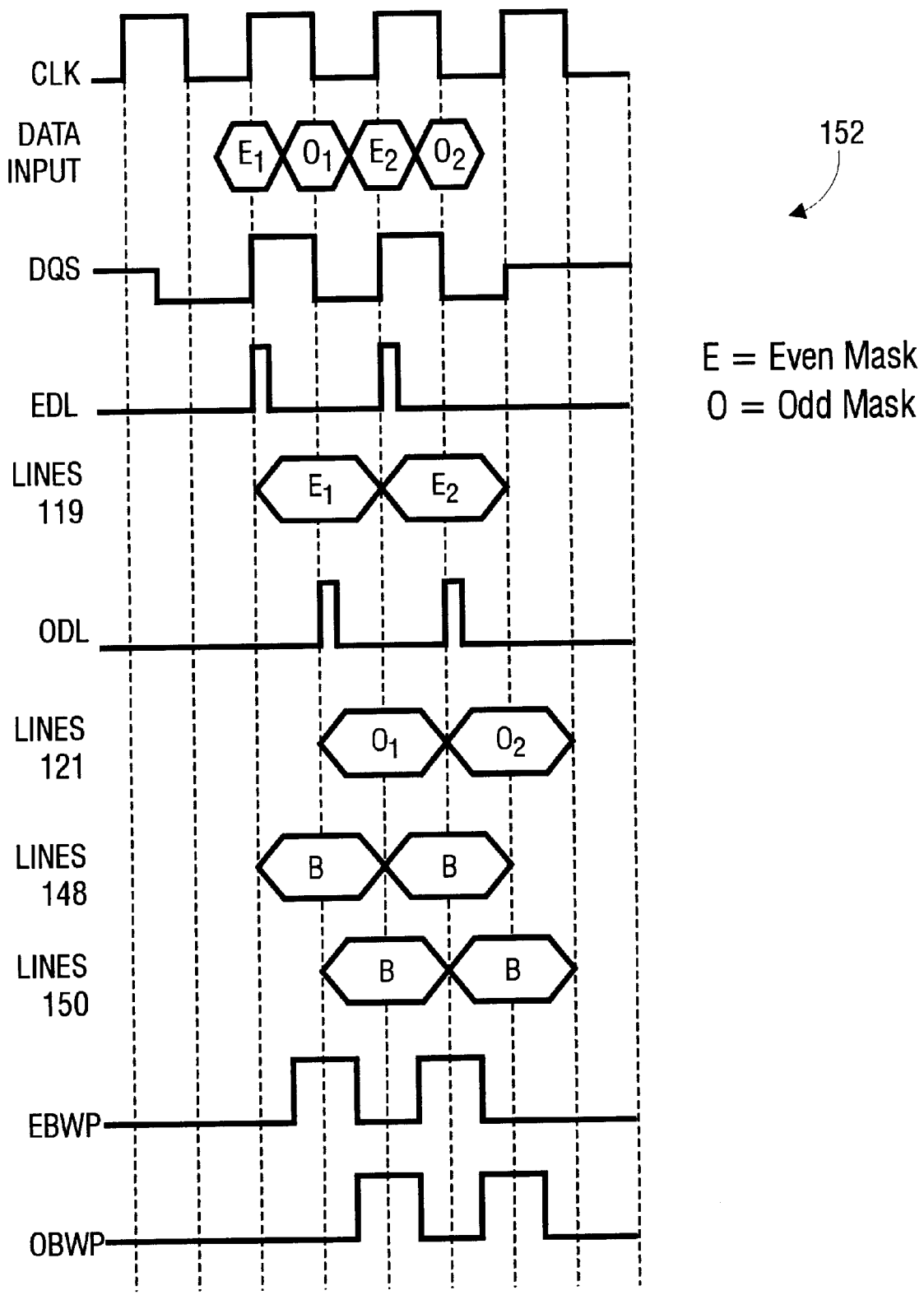
FIG. 7 is a timing diagram for the memory device of FIG. 5 as operated in accordance with the invention.

FIG. 7 is a timing diagram 152 illustrating the operation of the memory device 140 of FIG. 5, for two successive block write cycles, with each block write cycle equal to one cycle of the master clock signal CLK. In one embodiment, an even data latch (EDL) signal (derived from rising edges of DQS) enables the even data input latch 114 and the even block-write pulse (EBWP) signal, internal to the write I/O logic unit 142A, controls transfer (through the write I/O logic unit 142A) of even block-write data (B) from lines 145 to the even memory array 131, subject to the even block-write mask signals 119. An odd data latch (ODL) signal derived from falling edges of DQS enables the odd data input latch 116 and the odd block-write pulse (OBWP) signal internal to write I/O logic signal 142B controls the transfer (through the write I/O logic unit 142B) of odd block-write data (B) from lines 150 to the odd memory array 133, subject to the odd block-write mask signal 121. The phase of the ODL signal trails the phase of the EDL signal by one-half of the CLK cycle. Therefore, the even and odd block-write fask and data transfers are one-half CLK cycle out of phase to start on the respective rising and falling edges of the same clock signal. The interleaved even and odd block-writes provide a method for doubling the data rate of block-write operations in the memory device 140 of FIG. 5.

Referring again to FIGS. 4 and 5, the memory device 132 is a random access memory (RAM). The RAM may be a static RAM (SRAM), or a dynamic RAM (DRAM). The memory device 132 may also be a content associative memory such as the memory device that would used for a tag look-up table of a cache memory. The invention is intended to cover block-writes at a double data rate to the above-described and other memory devices where implementation of the above-described apparatus and methods would not require undue experimentation to and ordinary person in the art in light of this disclosure.

Figure 8B:
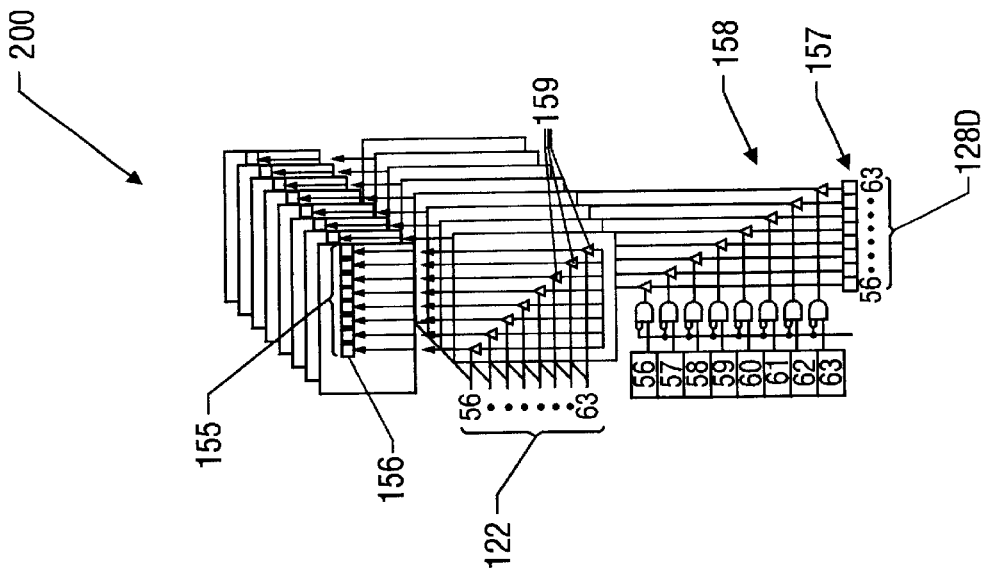
FIGS. 8a and 8b are a block-write I/O logic unit as illustrated in FIG. 4 in accordance with the invention.
Figure 8A:
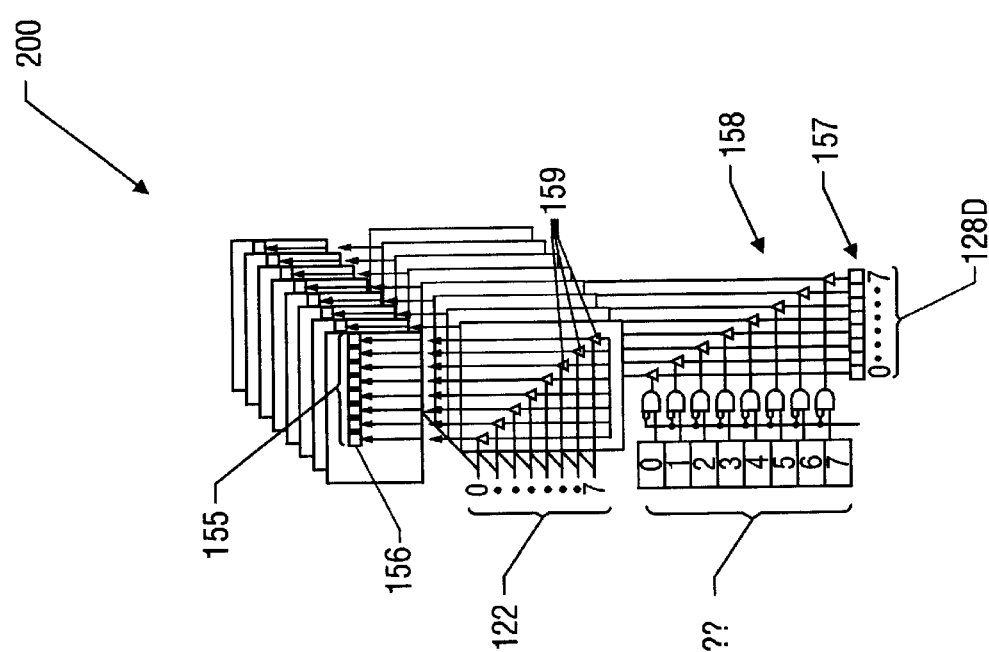

FIG. 8 illustrates one embodiment 200 of a portion of the write 1/O logic unit 126 of FIG. 4, which performs data block-writes to 8 byte-segment memory locations of 8 adjacent columns, e.g., the columns 155, of a row, e.g., the row 156. The output lines 158 from memory cells 157 of the write data register 128D connect in parallel to the same bit of memory locations at the adjacent column locations 155 of the block. The output lines 158 couple to input terminals of controllable buffers 159. Binary signals from the block-write mask register 122 control the input terminals of the controllable buffers 159. In the illustrated embodiment 200, each bit of the block-write mask data determines whether one byte at a particular column address of the block will be written. In the illustrate embodiment 200, the block-write mask is a column/byte (C/B) mask. In other embodiments, additional write-per-bit (WPB) mask and data mask (DM) may also control the output lines 158 from the cells 157 of the write data register 128D. The WPB and DM masks may enable bit and byte groups of the cells 157 of the write data register 128D to actually write.

Figure 10:
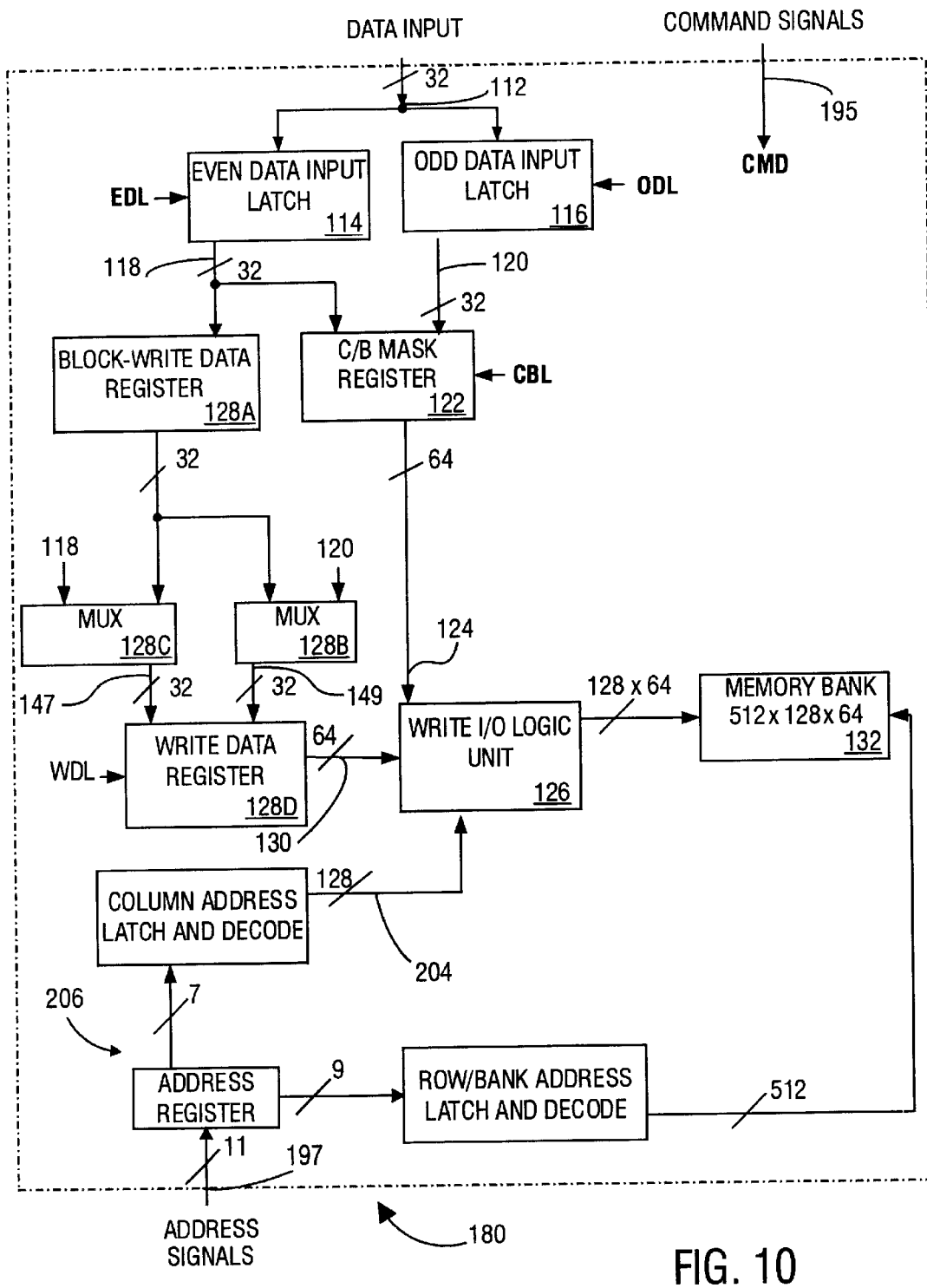
FIG. 10 is a block diagram of the memory device illustrated in FIGS. 4 and 6 in accordance with the invention.

FIG. 10 illustrates a specific embodiment 180 of the memory device 110 of FIG. 4. The data input port 112 connects, in parallel to the even and odd data input latches 114, 116. The even and odd data input latches 114, 116 transfer even and odd write data, block-write data, and even and odd column/byte (C/B) mask data from the data input port 112 to the respective register, over signal lines 118 and 120, in response to appropriate command signals described below. Since input data signals have 32 binary digits and the internal column/byte (C/B) mask data 124 and write/block-write data signals 130 have 64 binary digits, the memory device 180 performs all write operations at a double data rate.

Still referring to FIG. 10, write I/O logic unit 126 receives write/block-write data, mask data and column select control from the lines 130, 124, and 204, respectively. The write I/O logic unit 126 controls both writes and block-writes. Address logic 206 enables row addresses of the memory bank 132 during write and block-write operations. The memory bank 132 may comprise DRAM, or SRAM memory cells. The write I/O logic unit 126 performs masked block-writes to 64-byte memory locations (not shown) in the memory bank 132. Each memory location (not shown) of the memory bank 132 is 4 bytes, i.e., 32 bits. Thus, the 64 bits of column/byte (CB) mask data 124 can individually enable/disable one byte subsets for writing by a single block-write. The memory device 180 performs block-writes at a double data rate and can selectively mask one byte portions of the chosen block from being written.

Figure 11:
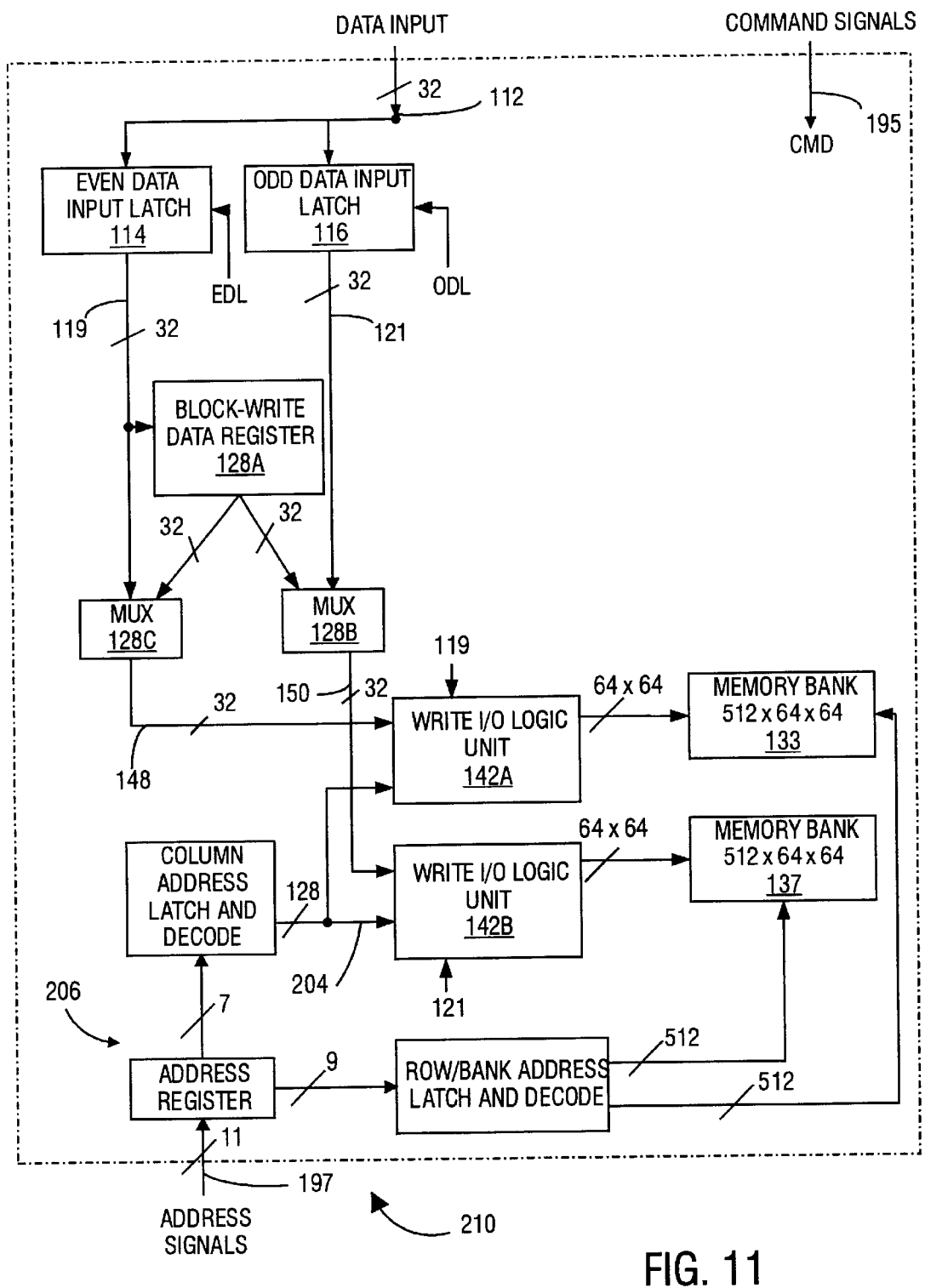
FIG. 11 is a block diagram of the memory device illustrated in FIGS. 5 and 7 in accordance with the invention.

FIG. 11 illustrates a specific embodiment 210 of the memory device 140 of FIG. 5. The data input port 112 connects, in parallel, to even and odd data input latches 114, 116. The even and odd data input latches 114, 116 transfer even and odd column/byte (C/B) mask data from the data input port 112 to the write I/O logic units 142A, 142B in response to the ECBL signal and the OCBL signal, respectively. The write I/O logic units 142A, 142B control both writes and block-writes. First and second multiplexers (MUXs) 128B, 128C transmit the block-write data from the block-write data register 128A (as opposed to normal write data from input latches 114 and 116) to the write I/O logic units 142A, 142B in response to decoded command signals which indicate a block-write cycle. The internal lines 119, 121 carrying the respective even and odd block-write mask signals and the internal lines 148, 150 carrying the block-write data signals have 32 binary digits, i.e., the number of binary digits of data from the data input port 112 and external data bus connections (not shown).

Still referring to FIG. 11, the memory device 210 implements block-writes at a double data rate by starting even and odd portions of block-writes on the respective rising and falling edges of clock cycles and by separately controlling even and odd block-write data signals. During each block-write cycle of FIG. 7, the first and/or second write I/O logic units 142A, 142B receive 32 binary digits of C/B mask data. The memory device 210 separately performs the even and odd block-writes to produce an effective double data rate, which can selectively write one byte portions of the block of memory locations.

FIG. 9 is a timing diagram illustrating the timing of external signals for block-writes and writes to the memory devices 180, 210 of FIGS. 10 and 11. At time 155, a command input terminal 195 of the memory device 180, 210 receives a command signal for a block-write, and address input terminals 197 receive an address signal for the block of locations in the memory bank 133, 137 to be written. At time 156, the data input port 112 receives even column and byte (C/B) mask data. At time 157, the data input port 112 receives odd column and byte (C/B) mask data. The block-write occurs between times 156 and 158, i.e. $t_{BW}$ equals two clock cycles in the illustrated block-write. $t_{BW}$ is also the time required between the block-write command and the next command, as shown. At time 158, the memory device 180, 210 starts to process a subsequent command, e.g., a write command. At times 158 and 159, the memory device 180, 210 receives data for the write command at the data input port 112. The even and odd write data are received on the respective rising and falling edge of one clock signal. The memory devices 180, 210 of FIGS. 10 and 11 receive write data for ordinary writes and C/B mask data for block-writes at a double data rate from the same data input port 112.

Figure 12:
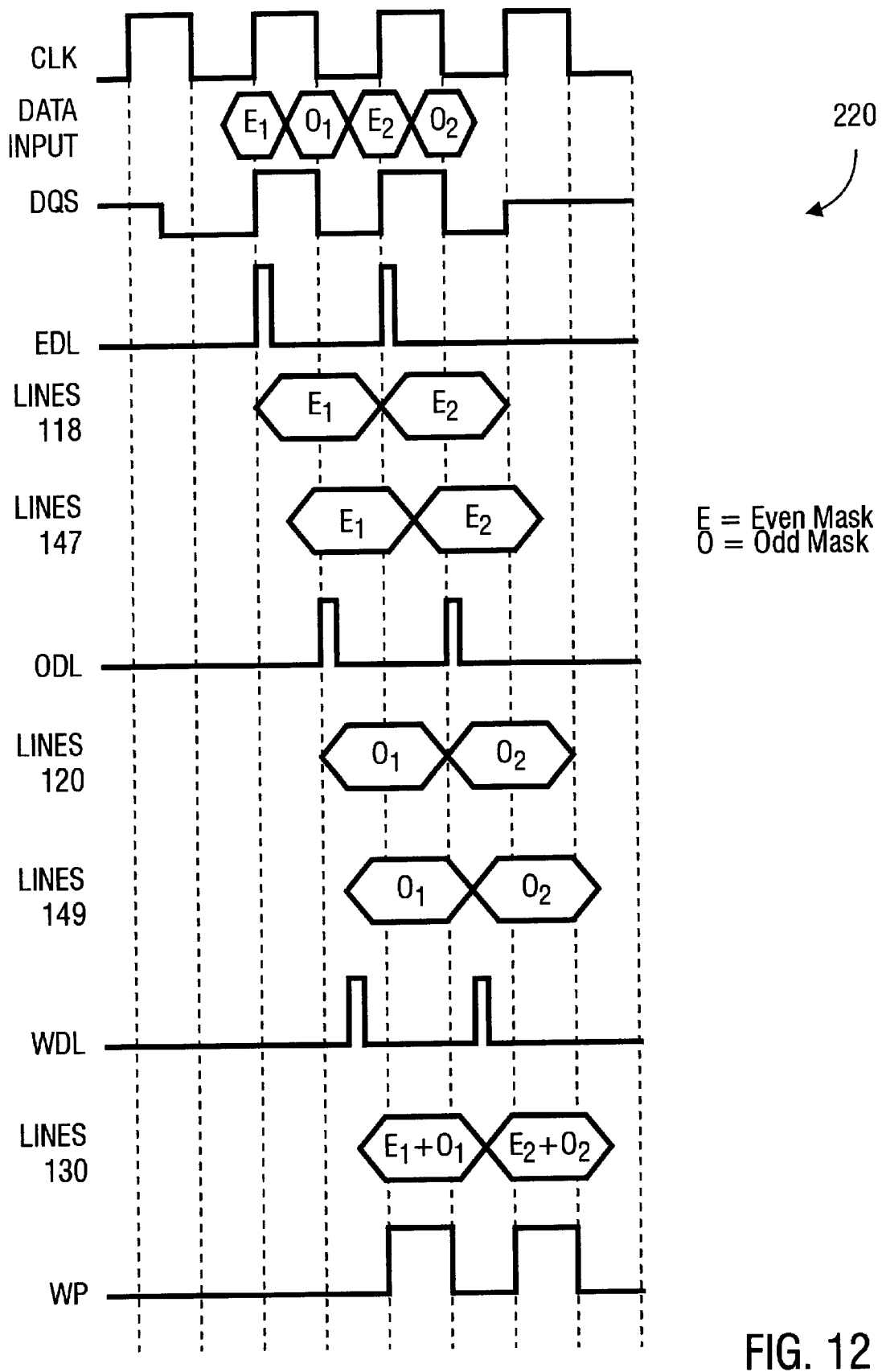
FIG. 12 is a timing diagram for the memory device of FIG. 10 as operated in accordance with the invention.

FIG. 12 is a timing diagram 220 illustrating the transmission of write data during normal write cycles in the memory device 180 of FIG. 10, and memory device 110 of FIG. 4 (the timing for block write cycles for the embodiments of FIGS. 4 and 10 is shown in FIG. 6). The EDL signal enables the even data input latch 114 to transfer even write data to line 118. Line 118 continues to transfer even write data until the arrival of a second rising edge of the CLK signal. The ODL signal enables the odd data input latch 116 to transfer odd write data from the data input port 112 to the line 120. Lines 120 continue to transfer odd write data until the arrival of a subsequent failing edge of the CLK signal. The MUXs 128B, 128C transfer both the even and the odd write data to a write data register 128D in response to appropriate control signals at select inputs thereof (not shown). The WDL signal enables the write data register 128D to transfer the even and the odd write data in response to receiving both the even and odd write data. In some embodiments, an additional latency occurs between receipt and transmission of the write data by the write data register 128D. Lines 124 are ignored by the write I/O logic unit during normal writes.

Figure 13:
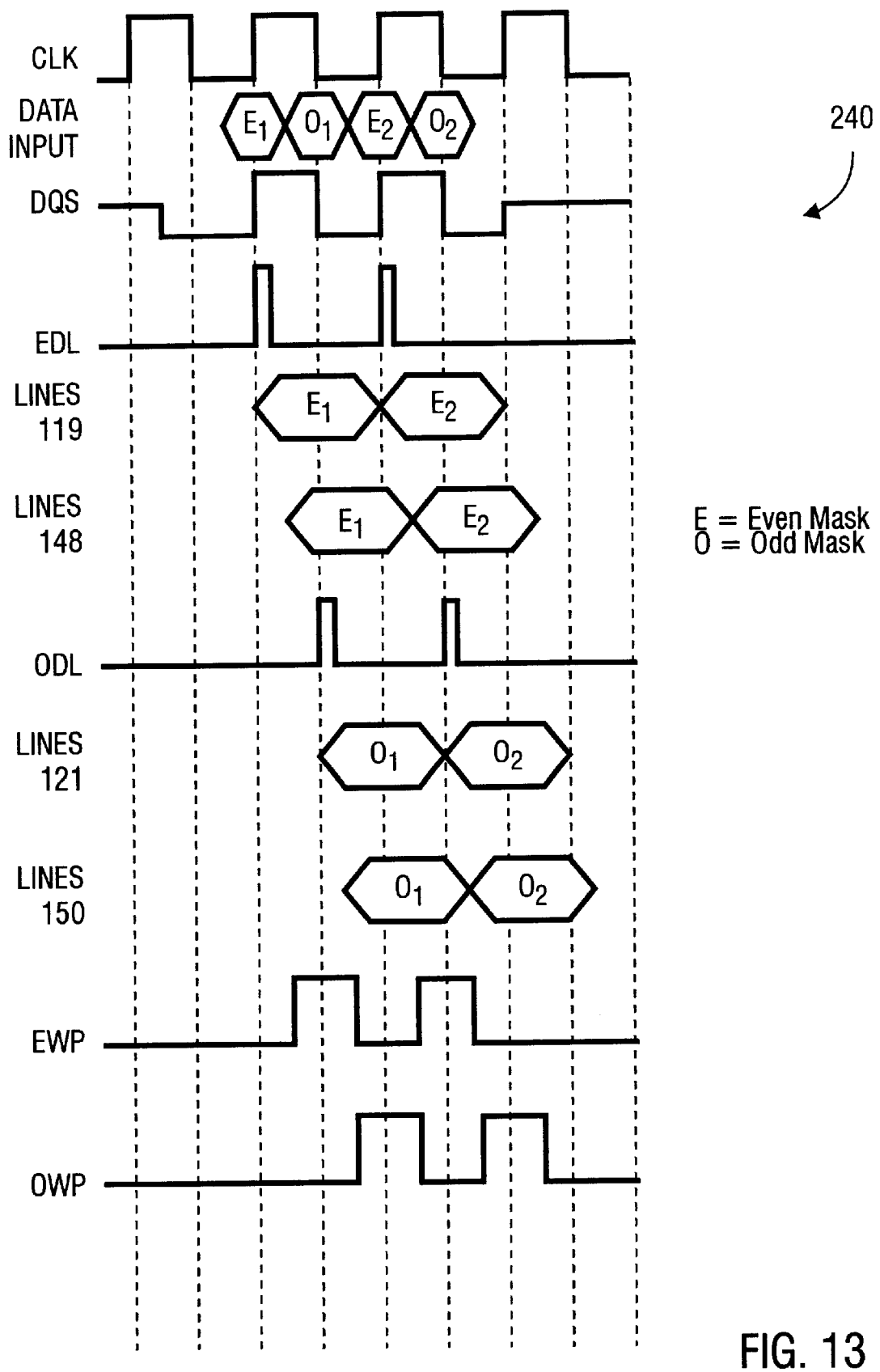
FIG. 13 is a timing diagram for the memory device of FIG. 11 as operated in accordance with the invention.

FIG. 13 is a timing diagram 240 illustrating the transmission of write data during normal write cycles in memory device 210 of FIG. 11 and memory device 140 of FIG. 5 (the timing for block write cycles for the embodiments of FIGS. 11 and 5 is shown in FIG. 7). The EDL signal enables the even data input latch 114 to transfer even write data from the data input port 112 to the first write I/O logic unit 142A through MUX 128C. Upon decoding a normal write command, the command decoder (not shown) instructs MUX 128C to transfer data from lines 119 to lines 148. The even data input latch 114 continues to transfer the same data until a second rising edge of the CLK signal. The ODL signal enables the odd data input latch 116 to transfer odd write data from the data input port 112 to the second write I/O logic unit 142B through MUX 128B, which is under similar control as MUX 128C. The odd data input latch 116 continues to transfer the same data signal until a second falling edge of the CLK signal. While the even and odd data input latches 114, 116 transfer the even and odd data signals through MUXes 128C and 128B, even and odd write pulse signals (internal to write I/O logic units 142A and 142B) control the transfer of even and odd data to respective memory locations.

Figure 14:
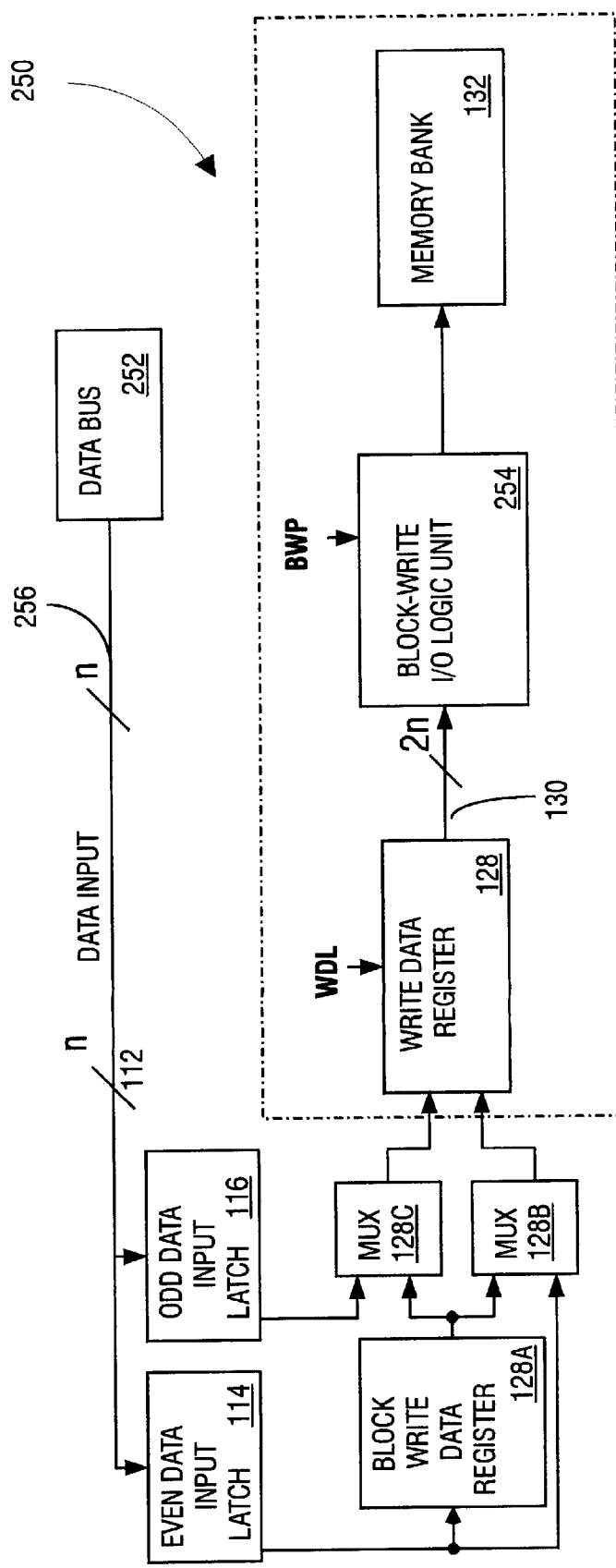
FIG. 14 is a memory device, constructed and operated in accordance with the invention.

FIG. 14 is another embodiment of a memory device 250, which performs block-writes at a double data rate. An external data bus 252 couples to the data input port 112 of the memory device 250. Both the external data bus 252 and the data input port 112 carry data signals having n binary digits. The data input port 112 connects to even and odd data input latches 114, 116, which receive data for ordinary writes to the memory device 250. Even data input latch 114 also receives block-write data to be stored in the Block Write Data Register 128A. Multiplexers 128B, 128C direct either normal write data or block-write data to the write data register 128, depending on the type of write cycle. For a block-write cycle, block write data is directed to the write data register 128, thereby forming a 2n-bit data word from the n-bit block-write data register 128A. The write data register 128 has 2n output lines 130 connecting to the block-write I/O logic unit 254. The block-write I/O logic unit 254 controls the actual block-write store operations to the memory bank 132. The memory bank 132 may be a RAM, a DRAM, a SRAM, or banks thereof. The memory device 250 performs block-writes at a double data rate, because the data input port only carries n digit binary signals and the write data register 128 transmits 2n digits of binary data to the block-write I/O logic unit 254.

Figure 15:
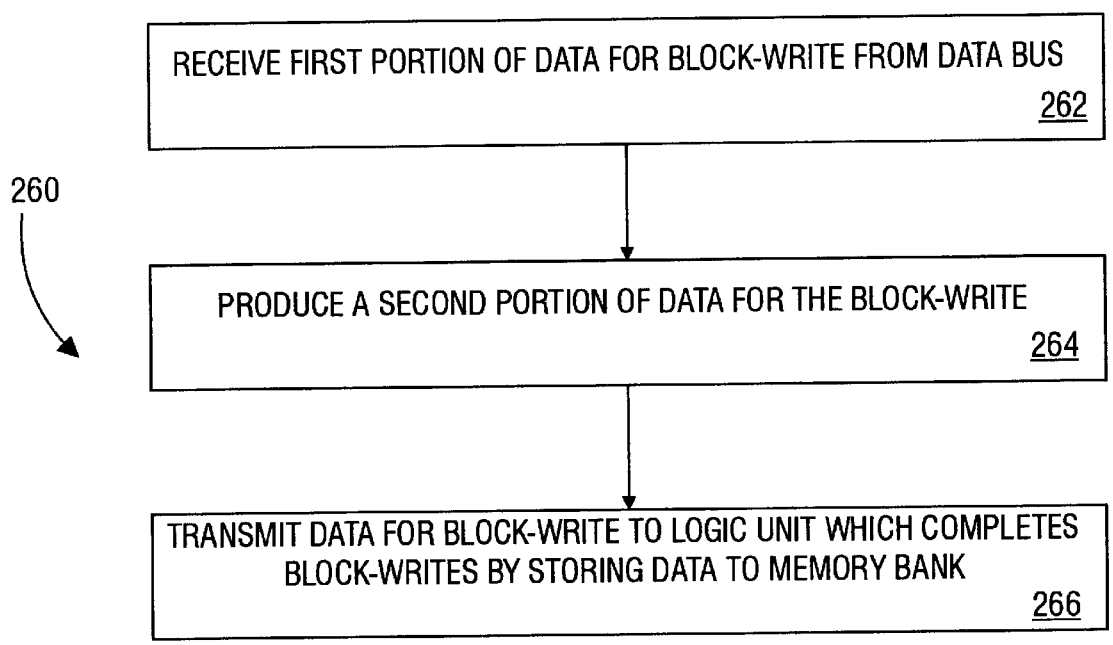
FIG. 15 is a flowchart describing operations, of the device in FIG. 14, performed in accordance with the invention.

FIG. 15 is a flowchart illustrating a method 260 of performing a block-write to the memory device 250 of FIG. 14. At block 262, the block-write data register 128A receives a first portion of the block-write data from the external data bus 252. At block 264, the block-write data register 128A produces a second portion of the block-write data. In some embodiments, the second portion of the block-write data is received separately from the first portion via the external data bus 252. In other embodiments, the second portion of the block-write data is internally generated, e.g., by copying the first portion of the block write data to a register to produce the second portion of the block-write data. The first and second portions may each be half of the data for a single block-write. The external bus 252 is unable to deliver both portions of the block-write data to the memory device 250 in parallel, i.e., there are too few bus data lines 256 to do so. In some embodiments, the block-write data register 128A receives the first and second portions of the block-write data in first and second data packets from the external data bus 252. The first and second packets are received on the rising and falling portions of the same timing signal. At block 266, the write data register 128 transmits the first and second portions of the block-write data to the block-write I/O logic unit 254 so that the write may be completed.

Still referring to FIG. 15, the method 260 may perform a block-write with or without a block-write mask (not shown). In various embodiments, the block-write I/O logic unit 254 transfers the block-write data from the write data register 128 to the memory bank 132 either in parallel or in two pieces controlled by staggered internal block-write pulse (BWP) timing signals.

While the invention is susceptible to various modifications and alternative forms, specific embodiments thereof have been shown by way of example in the drawings and described in detail above. It should be understood, however, that the description of specific embodiments is not intended to limit the invention to the particular forms disclosed, but on the contrary, the intention is to cover all modifications, equivalents, and alternatives falling within the spirit and scope of the invention as defined by the appended claims.

What is claimed is:

1. A memory device, comprising:
    first and second registers each adapted to store n bits of data for a block-write;
    at least one memory bank;
    a data input port adapted to write data to the first and the second registers, the data input port being capable of receiving no more than n bits of data in parallel;
    a hardware device to block-write 2n bits of data from the first and second registers to the memory bank;
    wherein the data port is adapted to write data to the first register, the first register being adapted to copy the data written thereto to the second register.

2. A random access memory, comprising:
    a data input port;
    first and second data latches adapted to receive first and second n-bit portions of block-write mask data from the data input port and to transmit the respective first and second n-bit portions of the block-write mask data in response to respective first and second control signals;
    a write logic unit adapted to control masked block-writes and to receive said first and second n-bit portions of block-write mask data from the first and second data latches; and
    a data memory bank, the write logic unit adapted to block-write data masked by the mask data to the data memory bank at least twice during a block-write cycle.

3. The random access memory of claim 1, further comprising a register to receive block-write data from the data input port and to send block-write data to the write logic unit in response to a control signal.

4. The random access memory of claim 1, wherein the write logic is adapted to block-write data on the rising and falling edges of the selected clock signal.

5. The random access memory of claim 1, further comprising:
    a second input port;
    a column address latch connected to the second input port, the column address latch adapted to provide column address signals to one of the write logic unit and the memory bank.

6. The random access memory of claim 5, wherein the block-write mask data is adapted to activate selected columns of a block of locations of the memory bank, the masked block-write to write in the block of locations.

7. The random access memory of claim 2, further comprising:
    a mask input register to receive 2n-bits of block-write mask data at a time from the first and second data input latches and to send the block-write mask data to the write logic unit.

8. The random access memory of claim 7, wherein the block-write mask data is adapted to activate a portion of the data memory bank to be written by data from the block-write register.

9. The random access memory of claim 2, wherein the block-write mask data is adapted to enable one of a portion of column addresses of a block write and a portion of bytes of a block of locations in the data memory bank.

10. The random access memory of claim 2, further comprising first and second n-bit registers to receive first and second n-bit portions of block-write data from the data input port, the write logic unit adapted to interleave sending the first portion of the block-write data to a first portion of a block of the data memory bank with sending the second portion of the block-write data to a second portion of a block of the data memory bank during a block-write cycle.

11. The random access memory of claim 2, further comprising:
    a first n-bit register connected to the data input port to receive a first n-bit portion of block-write data; and a second n-bit register to receive a second n-bit portion of the block-write data, the write logic unit adapted to interleave sending the first n-bit portion of the block-write data to a first portion of a block of the data memory bank with sending the second n-bit portion of the block-write data to a second portion of a block of the data memory bank during a block-write cycle.

12. The random access memory of claim 11, wherein the data input port is adapted to write n bits of data at a time to the first register, the first register being adapted to copy the data written thereto to the second register.

13. The random access memory of claim 11, wherein the data input port is coupled to write the same n bits of data to the first and second registers during one clock cycle.

14. The random access memory of claim 2, further comprising a register to receive n bits of block-write data at a time from the data input port, the write logic unit adapted to interleave sending the n bits of block-write data to a first portion of a block of the data memory bank with sending the n bits of block-write data to a second portion of a block of the data memory bank during said one clock cycle.

15. The random access memory of claim 14, wherein the first and second n-bit portions of the block-write mask data are adapted to enable one of a portion of column addresses of a block-write and a portion of the bytes thereof.

16. The random access memory of claim 2, further comprising third and fourth n-bit data input latches to receive first and second n-bit portions of write data from the data input port and to send the first and second n-bit portions of the write data to the write logic unit.

17. A method for performing masked block-writes, comprising:
    writing mask data to a memory device at a double data rate whereby a first n-bit portion of mask data is written to the memory device during a first edge of a clock cycle and a second n-bit portion of mask data is written to the memory device during a second edge of said clock cycle; and
    performing the masked block-write using the mask data;
    wherein the act of performing the masked block-write comprises interleaving:
        performing a first write to a first portion of a block of memory locations; and
        performing a second write to a second portion of a block of memory locations; and wherein:
            the act of performing a first write to a first portion uses the first n-bit portion of the mask data; and
        the act of performing a second write to a second portion using the first n-bit portion of the mask data.

18. The method of claim 17, wherein said first edge is a rising edge and said second edge is a falling edge.

19. The method of claim 17, further comprising transmitting the first and the second portions of the mask data to a logic unit, the logic unit to control the masked block-write.

20. The method as set forth in claim 17, wherein the writes to the first and second portions start in first and second portions of a cycle of a clock signal, the clock cycle determining the data rate.

21. A method for performing a block-write to a memory bank, comprising:
    receiving a first n-bit portion of block-write data from a data bus;
    then, producing a n-bit second portion of the block-write data; and
    block-writing the first and second portions of the block-write data at one time to the memory bank;
    wherein the act of producing includes copying the first n-bit portion of the block-write data from a first register to a second register and the act of block-writing includes writing 2n bits of data at one time from the first and second registers.

22. The method as set forth in claim 21, wherein the act of producing includes receiving the second n-bit portion of the block-write data from the data bus during a second half of a clock cycle and storing each portion in a register, the first portion of the block-write data being received in a first portion of the clock cycle.

23. The method as set forth in claim 22, wherein the acts of receiving a first n-bit portion and receiving the second n-bit portion occur in response to rising and falling edges of a clock cycle.

24. The method as set forth in claim 21, wherein the act of producing includes storing the first n-bit portion of the block-write data in an n-bit register and providing two sets of outputs from that register.

25. The method as set forth in claim 21, wherein the act of producing includes storing the first n-bit portion of the block-write data in an n-bit register and fanning out the register output to two halves of the memory bank.

26. A method for performing a block-write to a memory bank, comprising:
    receiving a first n-bit portion of block-write data from a data bus;
    then, producing a n-bit second portion of the block-write data; and
    block-writing the first and second portions of the block-write data at one time to the memory bank;
    receiving a first n-bit portion of block-write mask data from the data bus during a first half of a clock cycle;
    receiving a second n-bit portion of block-write mask data from the data bus during a second half of said clock cycle, said first and second clock cycle halves having equal length;
    sending the first and second n-bit portions of the block-write mask data to a write logic unit at a double data rate; and
    wherein the act of block-writing is a masked block-write performed with 2n bits of mask data.

27. The method as set forth in claim 26, wherein the acts of receiving the first portion and second n-bit portions of block-write mask data are performed in response to rising and falling edges of a clock cycle, respectively.

28. The method as set forth in claim 26, wherein the block-write mask data includes column mask data.

* * * * *

UNITED STATES PATENT AND TRADEMARK OFFICE
CERTIFICATE OF CORRECTION

PATENT NO. : 6,560,669 B1
DATED : May 6, 2003
INVENTOR(S) : Kevin J. Ryan

It is certified that error appears in the above-identified patent and that said Letters Patent is hereby corrected as shown below:

<u>Column 11,</u>
Line 50, the term "using the first" should be -- uses the second --.

Signed and Sealed this

Fourteenth Day of October, 2003

JAMES E. ROGAN
*Director of the United States Patent and Trademark Office*